Dec. 30, 1958  C. A. DAVIDSON  2,866,227
PRESSES FOR VULCANIZING RUBBER SOLES ON SHOES
Filed April 26, 1955  2 Sheets-Sheet 1

INVENTOR
CARL ALBERT DAVIDSON
BY Irwin S. Thompson
ATTY.

Dec. 30, 1958     C. A. DAVIDSON     2,866,227
PRESSES FOR VULCANIZING RUBBER SOLES ON SHOES
Filed April 26, 1955     2 Sheets-Sheet 2

INVENTOR
CARL ALBERT DAVIDSON
BY Irvin S. Thompson
ATTY.

United States Patent Office 2,866,227
Patented Dec. 30, 1958

2,866,227

PRESSES FOR VULCANIZING RUBBER SOLES ON SHOES

Carl Albert Davidson, Simrishamn, Sweden, assignor to A-B Svenska Skolastfabriken, Jarrestad, Sweden, a corporation of Sweden Application April 26, 1955, Serial No. 503,944

Claims priority, application Sweden December 20, 1954

2 Claims. (Cl. 18—17)

The present invention relates to a press for vulcanizing rubber soles on shoes. This press comprises two press members which can be brought together and moved apart and one of which carries a last for receiving a shoe while the other press member carries a heated plate which is adapted, when the press members are brought together, to bear against the underside of a rubber sole disposed on the shoe on said last, a plurality of moulding elements being so mounted for sliding movement on one of said press members as to be movable at an angle to the direction of movement of the press members into and from a position, in which they bear against the lateral edge of the rubber sole of the shoe on said last. The invention is essentially characterized by the fact that the moulding elements are connected to mould carrying members by means of links which, at least in the position in which the press members are most remote form each other, make an oblique angle both with the direction of movement of the press members and with that of the moulding elements, said mould carrying members being movable along guides which are parallel to the direction of movement of the press members, and operable with the aid of springs by means of the press member that does not carry the moulding elements. By this arrangement, it is possible, with the use of very simple mechanical means and in a rapid working operation, to exert by means of the moulding elements a specific surface pressure on the lateral edge of the sole, that is equally great as the specific surface pressure that the heated plate exerts at the underside of the sole.

Further features and advantages will appear from the following description, reference being had to the accompanying drawings which illustrate the invention by way of example.

Figure 1:
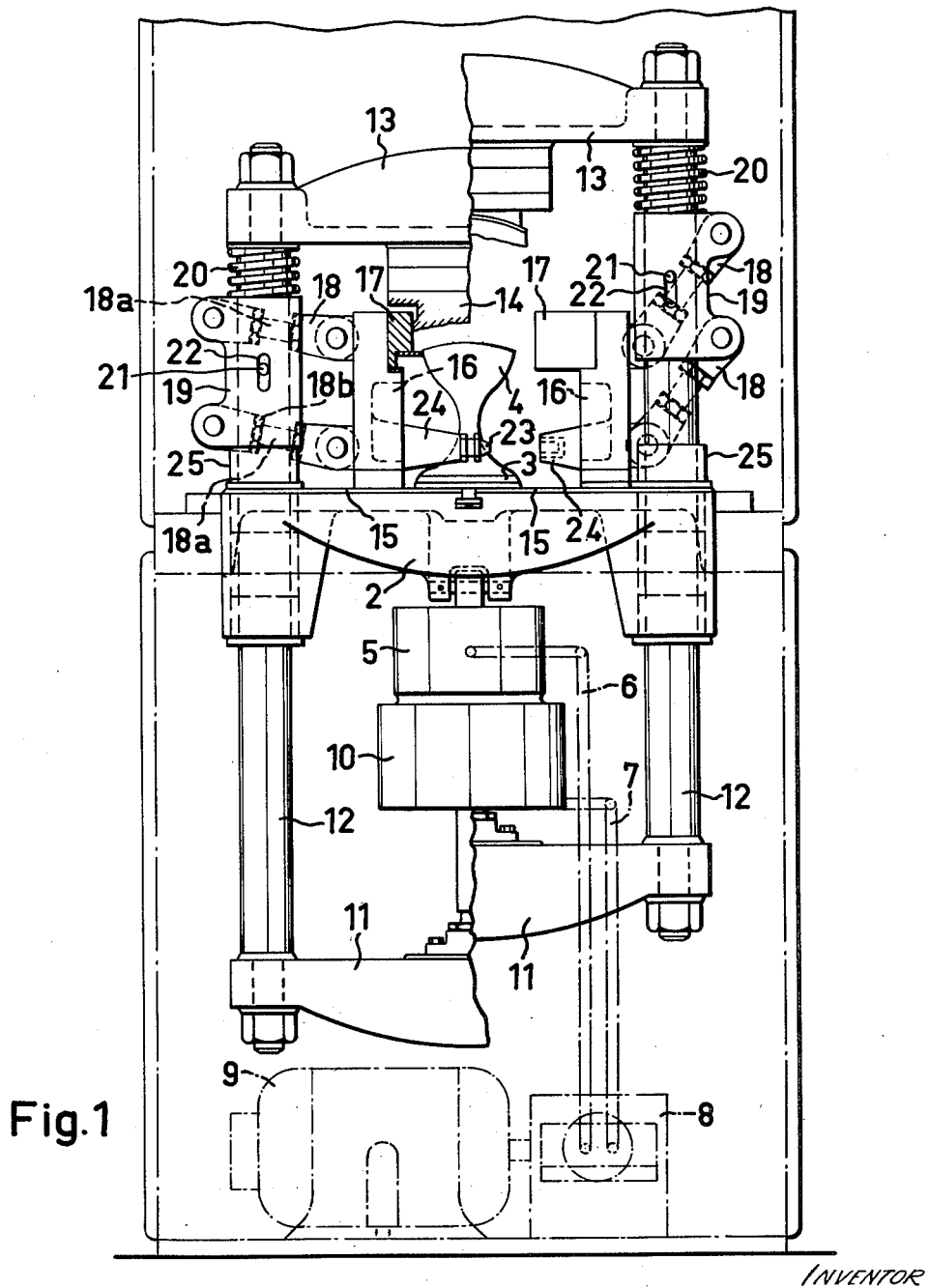
Fig. 1 shows a press according to the invention as seen from one side, the right-hand portion of the figure showing the press in open position, while the left-hand portion of the figure shows the press in closed or vulcanizing position.

The press shown in the drawings has a frame 1 which carries a fixed press table 2. At the upper side of the press table is disposed a support 3 for securing a last 4 with its underside in an upwardly facing position. At the underside of the press table 2 there is mounted a piston and cylinder assembly 5 to which pressure liquid is supplied in a known manner through two conduits 6, 7 from a hydraulic pump 8 which is driven by an electric motor 9. The pump and the motor are mounted in the lower part of the frame 1, and suitable valve means (not shown) are provided for reversing the liquid flow through the conduits 6, 7 in order that the assembly 5 may be raised or lowered.

The downwardly directed piston rod 10 of the assembly 5 is connected with a transverse member 11 which has four upwardly directed guide rods 12 extending through guides in the press table 2. Above said table the guide rods are connected to a press member 13 in the form of a plate which is thus vertically movable towards and away from the press table 2 with the aid of the assembly 5. At the underside of the press member 13 has a plate 14 heated in a known manner which is therefore not shown, and adapted, when the press member 13 is lowered towards the press table 2, to bear against the underside of a rubber sole (not shown) which is disposed on a shoe (not shown) mounted on the last 4.

At its upper side the press table 2 is provided with guides 15 on which two moulding elements 16 are horizontally displaceable towards and away from the last 4. In the position in which they are in the immediate vicinity of the last 4 (to the left in Fig. 1) the moulding elements 16 bear with a plate 17, heated in a known manner which is therefore not shown, against the lateral edge surface of the rubber sole of the shoe on the last 4. With the aid or four links 18 which in a manner known per se are adjustable in length by means of screws 18a and nuts 18b, each of the moulding elements 16 is hingedly connected to a mould carrying member 19 displaceably mounted on each of the rods 12. The sliders are in turn connected to the movable press member 13 by means of coil springs 20 which surround the rods 12 and the ends of which are secured to the sliders 19 and the press member 13, respectively. The path of movement of the sliders 19 along the rods 12 is limited by pins 21 which are secured to said rods and engage in longitudinal slots 22 in the sliders.

Figure 2:
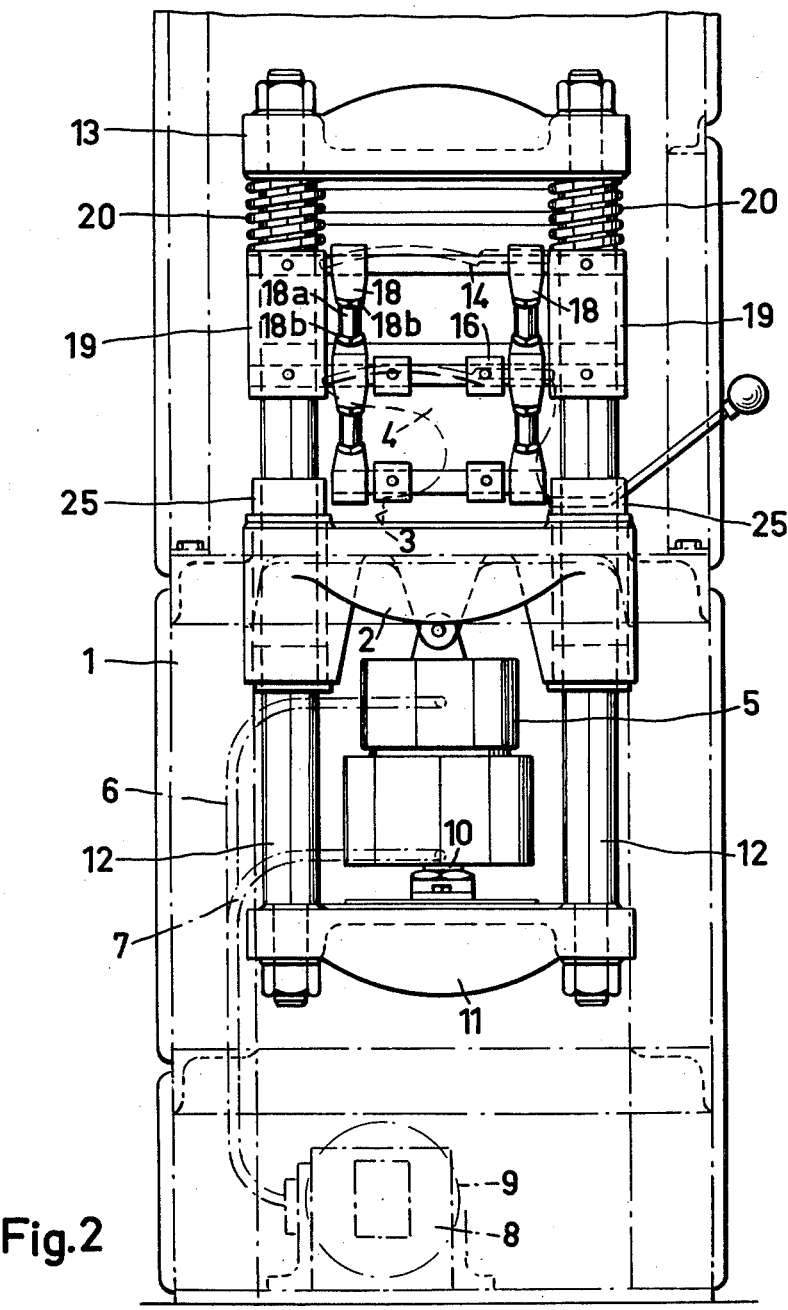
Fig. 2 shows the press as seen from the left in Fig. 1.

When the press is in its open position according to Fig. 2 and the right-hand part of Fig. 1, that is to say while the press member 13 and the plate 14 carried thereby are raised from the last 4 and the moulding elements 16 are moved aside from the last 4 by reason of the sliders 19 being held in the raised position by the press member 13, a shoe is put on the last 4 with the rubber sole to be vulcanized in an upwardly facing position. After that, the piston and cylinder assembly 5 is caused to move the transverse member 11 downwards, so that the rods 12 are lowered and press the heated plate 14 against the upwardly facing underside of the rubber sole under the action of the press member 13. When the press member 13 is lowered, it takes the sliders 19 along in its movement by reason of the springs 20, the links 18—which make an oblique angle both with the direction of movement of the press member 13 and with that of the moulding elements 16—pushing said moulding elements 16 along their guides 15 on the stationary press table 2 towards the last 4, thus pressing the heated moulding plates 17 against the lateral edge surface of the rubber sole. When the plates 17 are applied against the rubber sole before the end of the downward movement of the press member 13, the springs 20 will be compressed during the latter portion of the downward movement of the press member 13, while exerting a resilient pressure, determined by the resilient properties of the springs, on the sliders 19 whereby these transmit said pressure, through the toggle joint action of the oblique links 18, in an enlarged degree to the plates 17 and the lateral edge surface of the rubber sole. A suitable choice of springs 20 and a suitable adjustment of the length of the links 18 with the aid of the screws 18a and nuts 18b permit an exact adaptation of the size of the pressure exerted by the plates 17 to that exerted by the plate 14 on the rubber sole. At the compression of the springs 20 the pins 21 slide downwardly in the slots 22 from the upper ends thereof, and distance rings 25 secured to the press table 2 prevent the sliders 19 from being lowered so much that the links 18 will be swung past their horizontal positions.

The press is retained in the closed position shown in the left part of Fig. 1 for the time required for vulcanizing the rubber sole, and the assembly 5 is then caused to move the press member 13 upwardly while simultaneously withdrawing the plates 14 and 17 from the last 4 so that the shoe with the rubber sole vulcanized thereto may easily be removed from the last. Should the sliders 19 tend to remain in closed position when the press is opened, they are positively raised into open position by the pins 21 coming to bear against the upper ends of the slots 22.

In order that the moulding elements 16 may be adjusted into an exactly correct moulding position, the support 3 of the last 4 is provided with conical guide pins 23 adapted to engage in guide holes provided in projections 24 on the moulding elements.

Of course, the invention must not be considered as limited to the embodiment described above and illustrated in the drawing, for many modifications may be resorted to within the scope of the inventive idea defined in the appendant claims. It should be pointed out especially that the moulding elements 16 could be arranged for sliding movement on the press member 13 instead of the press table 2, the sliders 19 being then connected through the springs 20 to the press table 2 instead of the press member 13, and the links 18 being then naturally inclined upwardly towards the moulding elements 16. In addition, the press member 13 could be made stationary and the press member 2 movable, or both press members 2 and 13 could be movable towards and away from each other.

What I claim and desire to secure by Letters Patent is:

1. A press for vulcanizing rubber soles on shoes comprising a frame, a press table fixedly supported in said frame, a shoe last carried by said table, hydraulic means including a piston rod carried by the frame beneath the table, a plurality of guides projecting outwardly from the sides of the table, a transverse member within the frame beneath the hydraulic means, guide rods fixedly attached to said transverse member and extending upwardly for sliding movement through the guides, said piston rod being connected with the transverse member to move said member and guide rods, a press member connected to the upper ends of said guide rods for vertical movement therewith toward and away from the table, a heating plate of the underside of said press member adapted to bear against the underside of a rubber sole disposed on a shoe mounted on the last when the press member is lowered toward the press table, moulding elements positioned on guides for horizontal sliding movement on the table toward and away from said last, tubular members mounted for vertical sliding movement on the guide rods, pairs of vertically spaced links connecting said tubular members with said moulding elements so as to form link parallelograms together with said tubular members and said moulding elements causing said moulding elements to move horizontally on the press table without tilting tendency upon reciprocal movement of the tubular members, coil springs surrounding the guide rods and connected at their ends to the tubular members and said press member respectively, and a pin and slot connection between each tubular member and its respective guiding rod.

2. A press as defined in claim 1, including means for adjusting the length of said links, projections on the moulding elements provided with guide holes, and conical guide pins on the last support adapted to engage the guide holes to insure a correct moulding position.

References Cited in the file of this patent

UNITED STATES PATENTS

| | | |
|---|---|---|
| 2,193,395 | Dewey | Mar. 12, 1940 |
| 2,221,742 | Hoza | Nov. 12, 1940 |

FOREIGN PATENTS

| | | |
|---|---|---|
| 1,022,992 | France | Dec. 24, 1952 |
| 714,932 | Great Britain | Sept. 8, 1954 |